(12) United States Patent
Yonemoto

(10) Patent No.: US 7,408,539 B2
(45) Date of Patent: Aug. 5, 2008

(54) SOLID-STATE IMAGING APPARATUS AND SAMPLING CIRCUIT

(75) Inventor: Kazuya Yonemoto, Suita (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 524 days.

(21) Appl. No.: 11/100,510

(22) Filed: Apr. 7, 2005

(65) Prior Publication Data

US 2006/0017714 A1    Jan. 26, 2006

(30) Foreign Application Priority Data

Jul. 20, 2004  (JP)  ............... 2004-212182

(51) Int. Cl.
*G09G 5/00* (2006.01)
(52) U.S. Cl. .................. 345/204; 345/205; 345/207; 345/211; 345/212
(58) Field of Classification Search ......... 345/204–212; 348/294, 308, 241, 317, 245, 283, 507; 357/462; 250/208.1, 423; 257/291; 358/509
See application file for complete search history.

(56) References Cited

U.S. PATENT DOCUMENTS

| | | | | |
|---|---|---|---|---|
| 3,582,540 A | * | 6/1971 | Adler et al. ................. | 348/507 |
| 4,574,313 A | * | 3/1986 | Battson ...................... | 348/317 |
| 4,649,430 A | * | 3/1987 | Hynecek ..................... | 348/245 |
| 4,656,503 A | * | 4/1987 | Hynecek ..................... | 348/283 |
| 5,389,971 A | * | 2/1995 | Ishida et al. ................ | 348/294 |
| 5,471,515 A | | 11/1995 | Fossum et al. | |
| 6,075,564 A | * | 6/2000 | Mizuno ...................... | 348/294 |
| 6,140,630 A | * | 10/2000 | Rhodes ..................... | 250/208.1 |
| 6,222,175 B1 | * | 4/2001 | Krymski ................... | 250/208.1 |
| 6,407,440 B1 | * | 6/2002 | Rhodes ....................... | 257/462 |
| 6,483,541 B1 | | 11/2002 | Yonemoto et al. | |
| 6,654,057 B1 | * | 11/2003 | Rhodes ...................... | 348/294 |

(Continued)

FOREIGN PATENT DOCUMENTS

JP    10-145681    5/1998

(Continued)

OTHER PUBLICATIONS

Jaya Bandyopadhyay et al. Importance of Damping and Resonance in Thin-Film integrated Decoupling Capacitor Design Georgia Tech, pp. 31-34 IEEE 1997.*

*Primary Examiner*—Prabodh Dharia
(74) *Attorney, Agent, or Firm*—Wenderoth, Lind & Ponack, L.L.P.

(57) ABSTRACT

A solid-state imaging apparatus which prevents fixed pattern noise from occurring is provided, the fixed pattern noise having a correlation in a column direction (or a row direction) caused by non-uniformity of a sampling circuit itself. The solid state imaging apparatus comprises a sampling circuit in which a signal from a photodiode PD is sampled. And, the sampling circuit includes: a sampling capacitor $C_{SH}$ for holding the signal from the photodiode PD; a sampling MOS switch M12 which (i) transmits the signal from the photodiode PD to the sampling capacitor $C_{SH}$, or (ii) blocks the transmission; and a damping capacitor $C_{DS}$ connected to (i) one of a source electrode and a drain electrode of the sampling MOS switch M12 which is located closer to the sampling capacitor $C_{SH}$ and (ii) a gate electrode of the sampling MOS switch M12.

11 Claims, 14 Drawing Sheets

U.S. PATENT DOCUMENTS

| | | | |
|---|---|---|---|
| 6,667,468 B2 * | 12/2003 | Kurosawa et al. | 250/208.1 |
| 6,801,253 B1 * | 10/2004 | Yonemoto et al. | 348/241 |
| 6,825,878 B1 * | 11/2004 | Rhodes | 348/308 |
| 6,885,396 B1 * | 4/2005 | Panicacci et al. | 348/241 |
| 6,980,242 B2 * | 12/2005 | Funakoshi et al. | 348/245 |
| 7,099,056 B1 * | 8/2006 | Kindt | 358/509 |
| 7,113,213 B2 * | 9/2006 | Matsunaga et al. | 348/308 |
| 7,136,763 B2 * | 11/2006 | Tate, Jr. | 702/64 |
| 7,224,009 B2 * | 5/2007 | Rhodes | 257/291 |
| 7,245,321 B2 * | 7/2007 | Panicacci et al. | 348/241 |
| RE39,768 E * | 8/2007 | Rhodes | 250/208.1 |
| 2001/0052574 A1 * | 12/2001 | Kurosawa et al. | 250/423 P |
| 2001/0052941 A1 * | 12/2001 | Matsunaga et al. | 348/308 |
| 2002/0012058 A1 * | 1/2002 | Mizuno | 348/308 |
| 2002/0149688 A9 * | 10/2002 | Matsunaga et al. | 348/308 |
| 2004/0233304 A1 * | 11/2004 | Kakumoto et al. | 348/241 |

FOREIGN PATENT DOCUMENTS

| JP | 10-173997 | 6/1998 |
|---|---|---|

* cited by examiner

FIG. 3B MOS switch ON state

FIG. 3C MOS switch OFF state

A period $C_G = C_{GS} + C_{GO} + C_{GD}$

B period

SOLID-STATE IMAGING APPARATUS AND SAMPLING CIRCUIT

BACKGROUND OF THE INVENTION (1) Field of the Invention

The present invention relates to a solid-state imaging apparatus which is suitable for an image input apparatus such as a video camera and a digital still camera, and in particular, to a sampling circuit which reads out a signal from a Metal Oxide Semiconductor (MOS) imaging apparatus or Complementary Metal Oxide Semiconductor (CMOS) imaging apparatus.

(2) Description of the Related Art

Due to the widespread use of image input devices such as video cameras and digital still cameras, various types of solid-state imaging apparatuses have been suggested (for example, refer to Japanese Laid-Open Patent application No. H-10-173997).

FIG. 1 is a circuit diagram of a conventional solid-state imaging apparatus. A unit pixel (photodiode) includes: a photodiode PD; a read-out MOS transistor M1; a floating diffusion FD; a reset MOS switch M2; an amplified MOS switch M3; and a row-selecting MOS switch M4. A vertical shift register 90 controls the operation in the pixel per row. A Correlated Double Sampling circuit (hereinafter referred to as CDS circuit) which includes a sampling MOS switch M12, a clamp capacitor capacity CCL, a sampling capacitor capacity CSH and a clamp MOS switch M16 is connected to each of column signal lines VSIGn and VSIGn+1. A signal whose fixed pattern noise of the pixel has been suppressed in the CDS circuit is outputted to a horizontal signal line HSIG, via a column-selecting MOS switch M14 controlled by a horizontal shift register 91, so as to be outputted as an image signal, via an amplifier AMP92 and a CDS93. Here, a VHB application circuit for applying a bias voltage VHB synchronized with a horizontal signal line reset pulse φ HR to the horizontal signal line HSIG is connected to the horizontal signal line HSIG, the circuit including a horizontal signal line reset MOS switch M15 and a constant voltage source VHB.

FIG. 2 is a timing chart showing operations of the conventional solid-state imaging apparatus as shown in FIG. 1. The concrete operation of the unit pixel is as follows. As shown in FIG. 2, during certain horizontal blanking period HBLK, in the pixel row of the corresponding horizontal scanning line (for example, mth row), first, the floating diffusion FD is reset to a supply voltage VDD, using a row-resetting pulse φ VRSTm outputted from the vertical shift register 90. Immediately, a row-selecting pulse φ VSLm is raised so that the reset level of the pixel is outputted to the column signal line VSIGn, floating diffusion FD of the pixel being in the reset state.

Using the above mentioned reset level of the pixel, the CDS circuit connected to the column signal line VSIGn executes the first sampling operation (hereinafter referred to as clamp). In the clamp, while (i) via the sampling MOS switch M12, the reset level of the pixel (the first pixel signal) is provided to the first electrode of the clamp capacitor $C_{CL}$ (the electrode connected to the sampling MOS switch M12), and (ii) via the clamp MOS switch M16, a clamp voltage VCL is applied to the second electrode of the clamp capacitor $C_{CL}$ (the electrode connected to the clamp MOS switch M16), a clamp pulse φ CL applied to a control electrode (hereinafter referred to as a gate electrode) of the clamp MOS switch M16 is reduced, so as to hold the clamp voltage VCL at the node between the clamp capacitor $C_{CL}$ and the sampling capacitor $C_{SH}$ (from t=t1 to t=t2).

Then, a row read-out pulse φ VRDm is raised in the middle of the same horizontal blanking period HBLK, and a signal charge is transferred from the photodiode PD to the floating diffusion FD. Since the change associated with the signal charge appears as a signal level (the second pixel signal) in the column signal line VSIGn, the CDS circuit executes the second sampling operation (hereinafter referred to as sampling), using the above mentioned signal level. In the sampling, (i) a sample pulse φ SH is changed to low level, and (ii) the voltage change (difference between the signal level and the reset level) in the column signal line VSIGn is held at the node between the clamp capacitor $C_{CL}$ and the sampling capacitor $C_{SH}$ (from t=t3 to t=t4). Here, the voltage held at the node has the value which has changed, from the clamp voltage VCL, by the dividing ratio of the capacity of the clamp capacitor $C_{CL}$ to the sampling capacitor $C_{SH}$ that is the difference between the signal level and the reset level. Thus, unevenness of the threshold voltages of the amplified MOS switch M3 in the unit pixel is deducted, and the fixed pattern noise of the pixel is suppressed.

The held voltage as described above sequentially appears per column in the horizontal signal line HSIG, via the column-selecting MOS switch M14 controlled by the horizontal shift register 91 (from t=t5 to t=t6). Here, due to the capacity division between the sampling capacitor $C_{SH}$ and the capacity $C_H$ of the horizontal signal line HISG, the voltage of the horizontal signal line HSIG changes, and the changed voltage is outputted as a pixel signal.

However, according to the conventional sampling circuit as described above, there is a problem that fixed pattern noise is generated, due to unevenness of the threshold voltages (unevenness among each column signal) of the MOS switch included in the CDS circuit connected to each column signal line.

The predominant mechanism in which unevenness occurs in respective sampling voltage in each of a plurality of sampling circuits, is as follows.

As shown in FIG. 3A, the sampling circuit basically includes a MOS switch and a capacitor $C_{SH}$, and operates by changing a gate voltage φ SH so that the MOS switch becomes OFF state from ON state. Such equivalent circuit becomes (i) a circuit as shown in FIG. 3B when the MOS switch has ON state, and (ii) a circuit as shown in FIG. 3C when the MOS switch has OFF state. As shown in the equivalent circuit in FIG. 3B, in the ON state, an input signal VIN and the sampling capacitor capacity $C_{SH}$ are in conduction state in which a sampling pulse φ SH is capacitively coupled with a gate capacitor $C_G$ of the MOS switch. Here, the gate capacitor $C_G$ has a total sum of (i) a gate-source capacity $C_{GS}$, (ii) a gate-drain capacity $C_{GD}$ and (iii) a gate oxide film capacity $C_{GO}$ (between channels) when the MOS switch is in the operation point of the linear area. On the other hand, as shown in the equivalent circuit of FIG. 3C, as the capacitor model changes in the OFF state, (i) the input signal VIN is capacitively coupled to the sampling pulse φ SH via the gate-drain capacity $C_{GD}$, (ii) the sampling capacitor capacity $C_{SH}$ is capacitively connected to the sampling pulse φSH via the gate-source capacity $C_{GS}$, and (iii) the input signal VIN and the sampling capacitor capacity $C_{SH}$ are in non-conduction state.

Using the capacitor model of the MOS switch as described above, as shown in FIG. 4A, in the case where two same sampling circuits are structured by a MOS switch which has different threshold voltages $V_{th1}$ and $V_{th2}$, due to the difference (unevenness) $\Delta V_{th}$ of the threshold voltages as shown in FIG. 4B, the difference (unevenness) ΔSH of the sampled voltages occurs, as shown in the following equations.

$$VSH1 = VIN - \frac{C_{GS}}{(C_{SH} + C_{GS})}V_{th1}$$ [Equation 1]

$$VSH2 = VIN - \frac{C_{GS}}{(C_{SH} + C_{GS})}V_{th2}$$

$$\Delta VSH = VSH1 - VSH2 = \frac{C_{GS}}{(C_{SH} + C_{GS})}\Delta V_{th}$$

According to the above mentioned mechanism, in the conventional solid-state imaging apparatus as shown in FIG. 1, unevenness occurs in the following operation phase.

(Clamp phase; from t=t1 to t=t2 in FIG. 2)

FIG. 5A is a circuit diagram showing only the part related to the clamp phase in the conventional circuit, in relation to the above mentioned phase, that is, the operation in which the first pixel signal is sampled. Here, the threshold value unevenness of the clamp MOS switch M16 in which a clamp pulse φ $C_L$ is applied is $\Delta V_{th-clamp}$. The gate-source capacity of the clamp MOS switch M16 is $C_{GS}$. The sampling capacitor capacity is $C_{SH}$, and the clamp capacitor capacity $C_{CL}$. The unevenness of the electric charge $\Delta Q_{CSH-clamp}$ (conversion of the threshold unevenness into electric charge) accumulated into the sampling capacitor can be shown in the following equation.

$$\Delta Q_{C_{SH}-clamp} = -\frac{C_{SH}C_{GS}}{C_{SH} + C_{CL} + C_{GS}}\Delta V_{th-clamp}$$ [Equation 2]

(Sample phase; from t=t3 to t=t4 in FIG. 2)

FIG. 5B is a circuit diagram showing only the part related to the sample phase in the conventional circuit, in relation to the above mentioned phase, that is, the operation in which the second pixel signal is sampled. Here, the threshold unevenness of the sampling MOS switch M12 in which the sample pulse φ SH is applied is $\Delta V_{th-sample}$. The gate-source capacity of the MOS switch is $C_{GS}$. The sampling capacitor capacity is $C_{SH}$, and the clamp capacitor capacity is $C_{CL}$. The unevenness of the electric charge $\Delta Q_{CSH-sample}$ accumulated into the sampling capacitor capacity can be shown in the following equation.

$$\Delta Q_{C_{SH}-sample} = -\frac{\frac{C_{SH}C_{CL}}{C_{SH} + C_{CL}}C_{GS}}{\frac{C_{SH}C_{CL}}{C_{SH} + C_{CL}} + C_{GS}}\Delta V_{th-sample}$$ [Equation 3]

(Horizontal output phase; from t=t5 to t=t6 in FIG. 2)

FIG. 5C is a circuit diagram showing only the part related to the horizontal output phase in the conventional circuit, in relation to the above mentioned phase, that is, the operation in which the signal voltage stored in the sampling capacitor is outputted to the horizontal signal line. Here, the threshold value unevenness of the column-selecting MOS switch M14 in which the column-selecting pulse φ Hn is applied is $\Delta V_{th-HSW}$. The gate-source capacity of the MOS switch is $C_{GS}$. The gate-drain capacity is $C_{GD}$. And, the total sum of the $C_{GS}$, $C_{GD}$ and the capacity of the gate oxide film is $C_G$. The unevenness of the electric charge quantity $\Delta Q_{CSHCH-Hout}$ which appears in the horizontal signal line that has the sampling capacitor and the horizontal signal line capacity $C_H$ can be shown in the following equation.

$$\Delta Q_{C_{SH}C_H-Hout} = $$ [Equation 4]

$$\left(\frac{C_{SH}C_{GS}}{C_{SH} + C_{GS}} + \frac{C_H C_{GD}}{C_H + C_{GD}} - \frac{(C_{SH} + C_H)C_G}{C_{SH} + C_H + C_G}\right)\Delta V_{th-HSW}$$

In the above mentioned three phases, due to the threshold value unevenness of the individually independent MOS switch, the electric charge unevenness occurs. Thus, the unevenness occurring in all of the phases is added, and becomes a longitudinal fixed pattern noise. If such longitudinal fixed pattern noise is converted into unevenness of signal voltages appearing in the horizontal signal line, the value can be shown in the following equation.

$$\Delta V = $$ [Equation 5]

$$\frac{1}{C_{SH} + C_H}(\Delta Q_{C_{SH}-clamp} + \Delta Q_{C_{SH}-sample} + \Delta Q_{C_{SH}C_H-Hout})$$

In other words, due to the unevenness of the threshold voltages (non-uniformity among each CDS circuit) among (i) the clamp MOS switch M16 structuring the CDS circuit connected to each column signal, (ii) the sampling MOS switch M12 and (iii) the column-selecting MOS switch M14, even with the same input signal, a different voltage is generated for each column. As a result, according to the conventional circuit structure, unless the threshold value unevenness of the MOS switch is removed, the longitudinal fixed pattern noise cannot be controlled.

SUMMARY OF THE INVENTION

An object of the present invention, in view of the above mentioned problems, is to provide a solid-state imaging apparatus and the like which prevent fixed pattern noise that has a column-direction (or a row-direction) correlation caused by non-uniformity of a sampling circuit itself.

In order to achieve the above mentioned object, the solid-state imaging apparatus according to the present invention comprises a sampling circuit in which a signal from a photodiode is sampled, wherein said sampling circuit includes: a sampling capacitor for holding the signal; a sampling Metal Oxide Semiconductor (MOS) switch which (i) transmits the signal to said sampling capacitor, or (ii) blocks the transmission; and a first damping capacitor connected to (i) one of a source electrode and a drain electrode of said sampling MOS switch which is located closer to said sampling capacitor and (ii) a gate electrode of said sampling MOS switch. Here, a capacity of said first damping capacitor is expressed by (i) a capacity between the source electrode of said sampling MOS switch and a reference potential, (ii) a capacity between the drain electrode and the reference potential, and (iii) said sampling MOS switch specific capacity.

Thus, in a plurality of sampling circuits, even if there is unevenness among the threshold voltages which are applied to the sampling MOS switches, the electric charge flowing into the sampling capacitors are not affected by the unevenness. Thereby, the signal unevenness is prevented in the sampling phase. And, the fixed pattern noise that has a column-direction (or a row-direction) correlation caused by non-uniformity of the sampling circuit itself can be prevented.

Said sampling circuit may further include: a column-selecting MOS switch which is a MOS switch that turns on or off a connection between said sampling capacitor and an output line; and a second damping capacitor which is a capacitor connected to (i) an electrode that is located closer to said sampling capacitor between a source electrode and a drain electrode of said column-selecting MOS switch, and (ii) a gate electrode of said column-selecting MOS switch. Here, a capacity of said second damping capacitor is expressed by (i) a capacity between the source electrode of said column-selecting MOS switch and a reference potential, (ii) a capacity between the drain electrode and the reference potential, (iii) said column-selecting MOS switch specific capacity, and (iv) said sampling MOS switch specific capacity.

Thus, even if there is unevenness among the threshold voltages applied to the column-selecting MOS switches in the plurality of sampling circuits, the signals outputted from the sampling capacitors to the output line are not affected by the unevenness. Thereby, the signal unevenness in the horizontal output phase is prevented. And, the fixed pattern noise that has a column-direction (or a row-direction) correlation caused by non-uniformity of the sampling circuit itself can be prevented. Here, the output line is, for example, a horizontal signal line which sequentially outputs pixel signals of one row according to the column-selecting signals from the horizontal shift register.

Said sampling circuit may further include a bias voltage application circuit in which a bias voltage is applied to the output line, and in said bias voltage application circuit, the bias voltage to be applied to the output line may be changed in synchronization with a control signal that turns off said column-selecting MOS switch.

Thus, (a) in the case where said sampling circuit further includes: a clamp capacitor which is a capacitor connected between (i) a column signal line that transmits the signal from the photodiode and (ii) said sampling MOS switch; and a clamp voltage application circuit in which a clamp voltage is applied to said clamp capacitor, and the signal transmitted from the photodiode is correlated double sampled, and (b) in the case where said sampling circuit further includes: a clamp capacitor which is a capacitor connected between said sampling MOS switch and said sampling capacitor; and a clamp voltage application circuit in which a clamp voltage is applied to said clamp capacitor, and the signal transmitted from said photodiode is correlated double sampled, the bias voltage applied to the output line is changed in synchronization with the clamp pulse. Thereby, the signal unevenness in the clamp phase is prevented. And, the fixed pattern noise that has a column-direction (or a row-direction) correlation caused by non-uniformity of the sampling circuit itself can be prevented.

The solid-state imaging apparatus may comprise two of said sampling circuits per the one column of photodiodes, and the two sampling circuits may be connected to each other in parallel so that one column signal line can be used for a common input, said column signal line transmitting a signal from the one column of photodiodes. Thereby, in the method in which two sampling circuits are used for one column signal line (or row signal line), that is, in the sampling method that differs from the correlated double sampling, the fixed pattern noise that has a column-direction (or a row-direction) correlation caused by non-uniformity of the sampling circuit itself can be prevented.

Said sampling circuit may further include a column-selecting MOS switch which is a MOS switch that turns on or off the connection between said sampling capacitor and the output line, and when the signal held in said sampling capacitor is outputted to the output line, said column-selecting MOS switch may be brought into a conduction state from a non-conduction state, then brought into the non-conduction state again. Thereby, the fixed pattern noise occurring from the column-selecting MOS switch can be removed.

Said first or second damping capacitor may be made up of (i) an electrode that is located closer to said sampling capacitor between a source electrode and a drain electrode of said sampling MOS switch, (ii) a gate electrode of said sampling MOS switch, and (iii) a gate oxide film of the sampling MOS switch sandwiched between said two electrodes. In other words, the first and second damping capacitors may be integrated with the MOS switch. Thus, the circuit size can be reduced.

The present invention can not only be realized as the above mentioned solid-state imaging apparatus, but also as a sampling circuit unit which the solid-state imaging apparatus comprises. As long as the sampling circuit uses the MOS switch and sampling capacitor, the sampling circuit may be used not only for the solid-state imaging apparatus, but also applied as the sampling circuit for other apparatuses.

According to the present invention, in the MOS or CMOS imaging device including a column sampling circuit, the longitudinal fixed pattern noise which collaterally occurs from the column sampling circuit (or row sampling circuit) connected to each column signal line (or each horizontal signal line) can be effectively removed.

Furthermore, in the solid-state imaging apparatus which uses a column CDS circuit according to the conventional method, the longitudinal fixed pattern noise cannot be reduced unless the sampling capacitor or clamp capacitor is enlarged so as not to be affected by the capacity of each unit held by the MOS switch. However, in the solid-state imaging apparatus which uses a column CDS circuit according to the present invention, the minimum capacity for the sampling capacitor or the clamp capacitor can be used. As a result, the solid-state imaging apparatus can be miniaturized.

FURTHER INFORMATION ABOUT TECHNICAL BACKGROUND TO THIS APPLICATION

The disclosure of Japanese Patent Application No. 2004-212182 filed on Jul. 20, 2004 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 3A, FIG. 3B and FIG. 3C are diagrams respectively showing conventional sampling circuits;

DESCRIPTION OF THE PREFERRED EMBODIMENT(S)

First Embodiment

Figure 1:
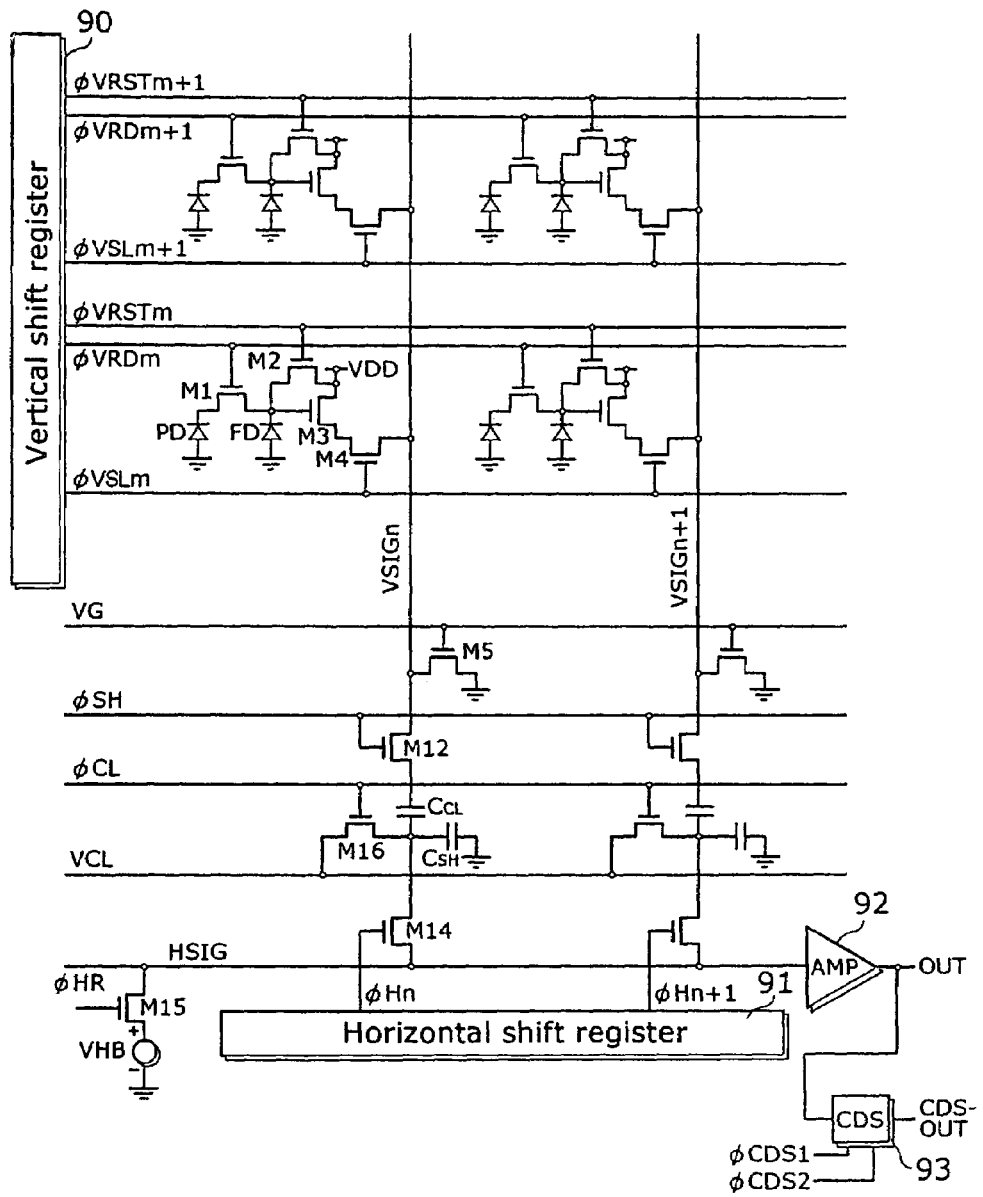
FIG. 1 is a circuit diagram of a conventional solid-state imaging apparatus.
Figure 2:
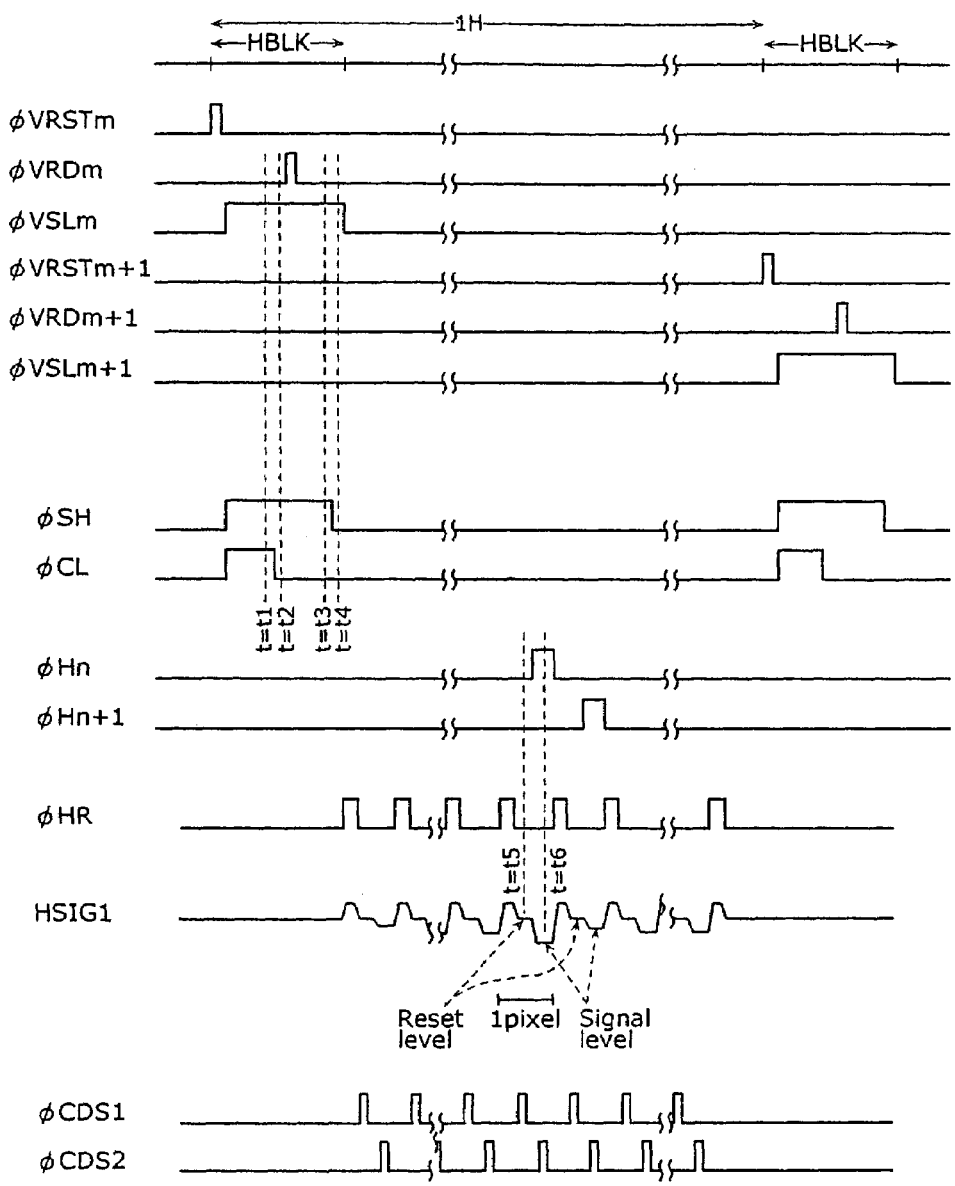
FIG. 2 is a timing chart showing operations of a conventional solid-state imaging apparatus.
Figure 3A:
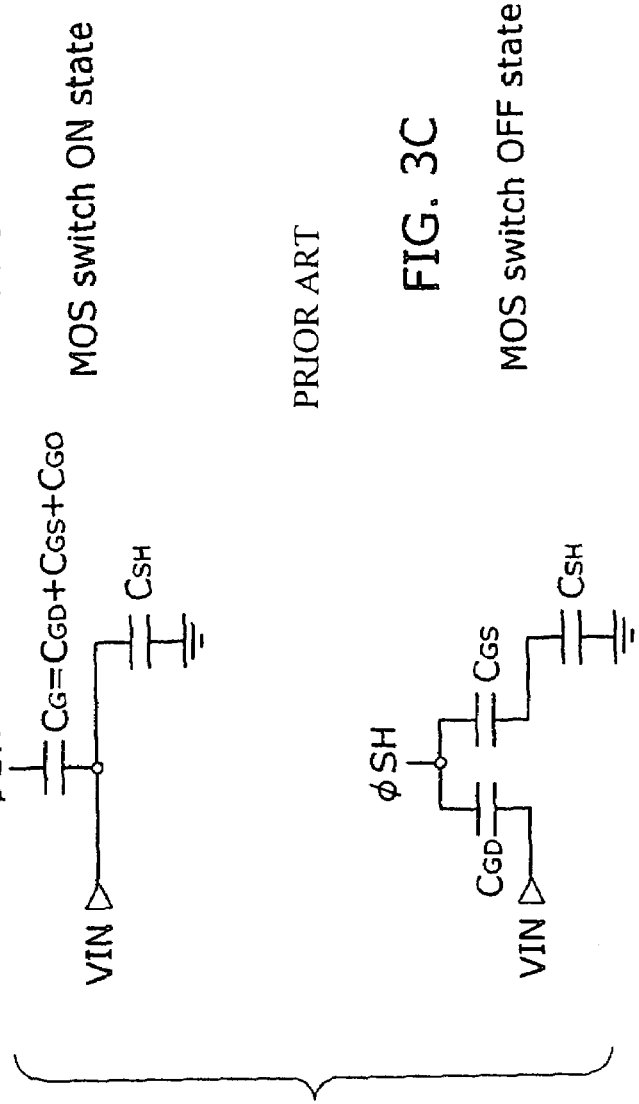
Figure 4A:
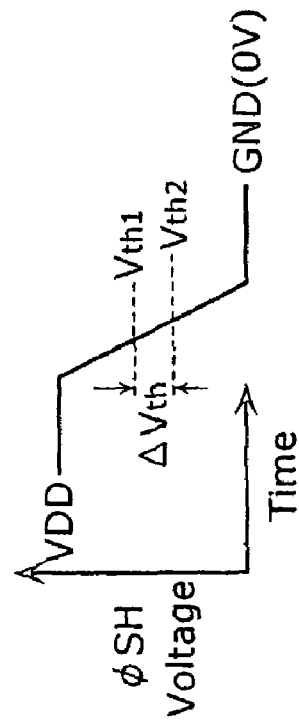
FIG. 4A and FIG. 4B are diagrams showing the mechanism in which unevenness occurs in the sampling voltage in a plurality of conventional sampling circuits.
Figure 4B:
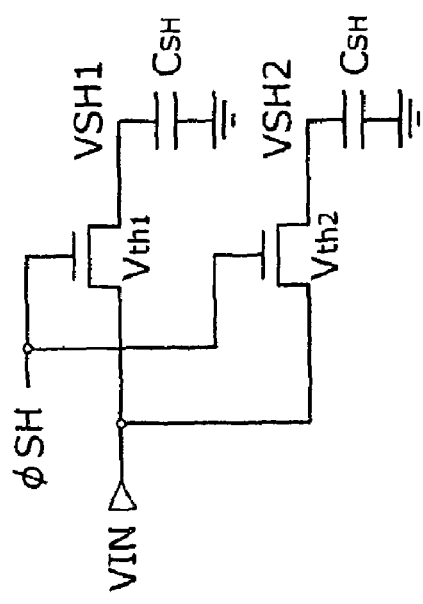
Figure 5A:
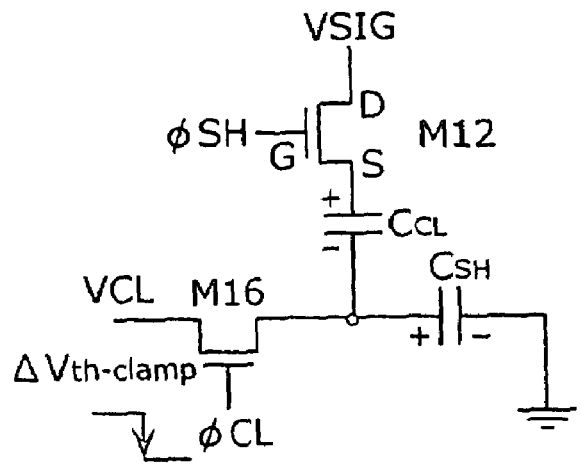
FIG. 5A, FIG. 5B and FIG. 5C are diagrams showing each operational phase in a conventional sampling circuit.
Figure 5B:
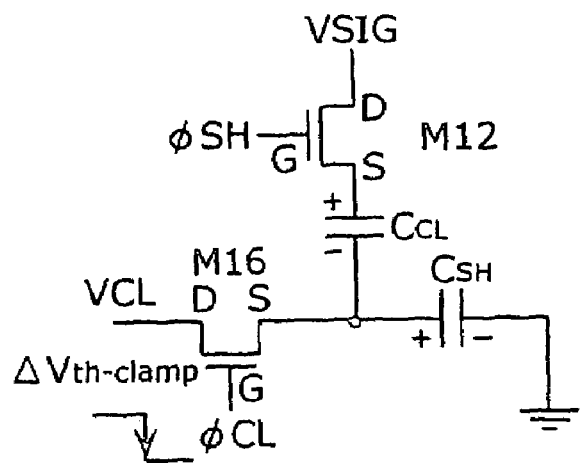
Figure 5C:
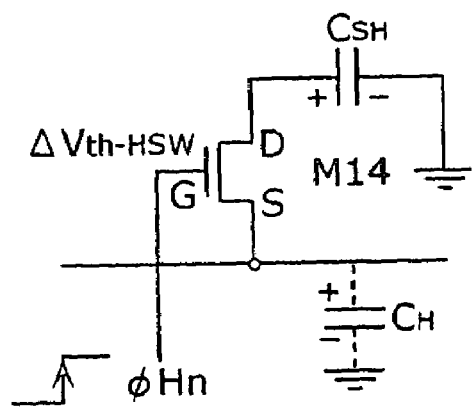
Figure 6:
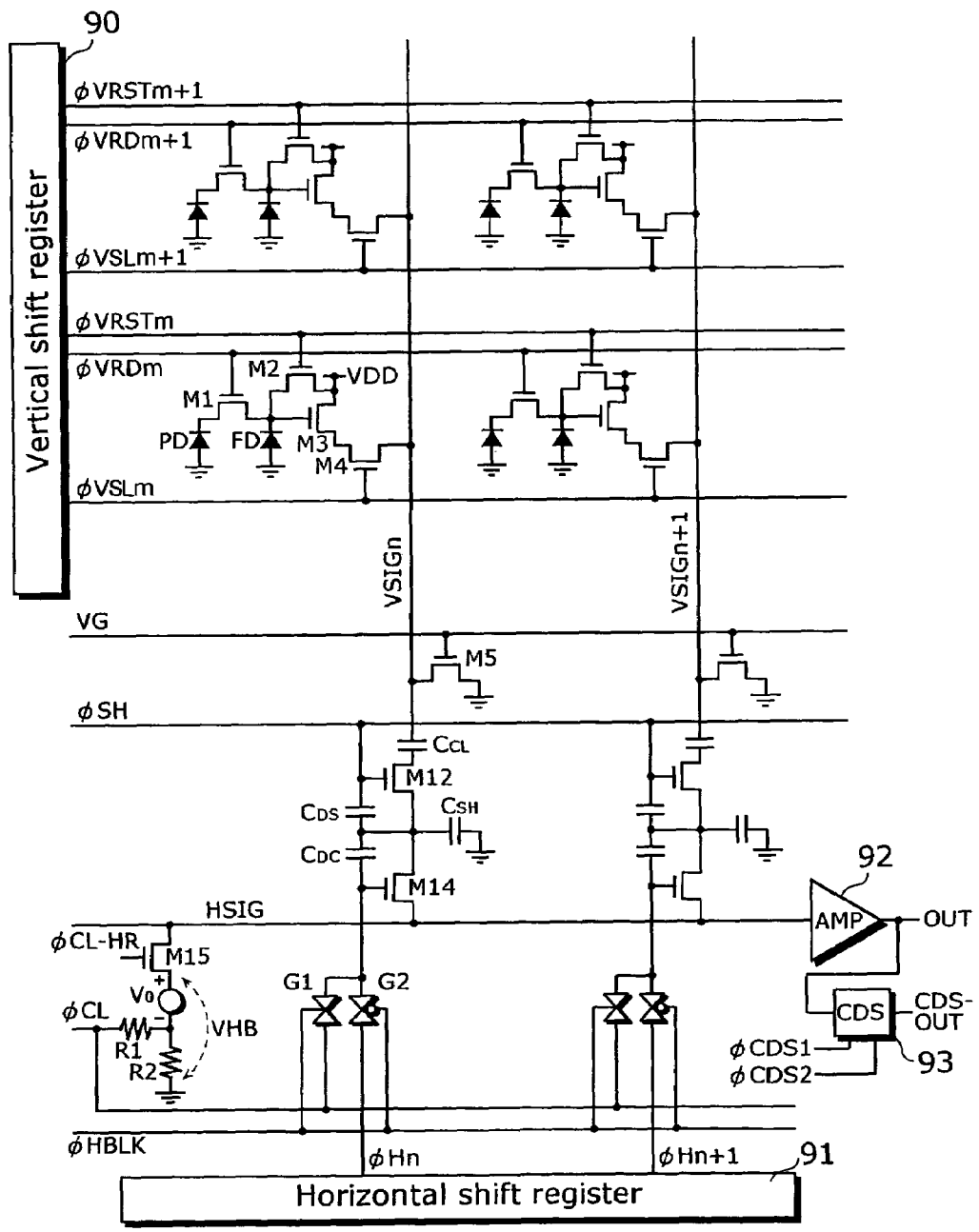
FIG. 6 is a circuit diagram of the solid-state imaging apparatus according to the first embodiment of the present invention.

FIG. 6 is a circuit diagram of the solid-state imaging apparatus according to the first embodiment of the present invention. Compared to the conventional circuit as shown in FIG. 1, the characteristic features which have been changed are: a CDS circuit (column CDS circuit) connected to each of column signal lines VSIGn and VSIGn+1; and the element structure of the column CDS circuit. The above mentioned column CDS circuit includes: a clamp capacitor $C_{CL}$; a sampling MOS switch M12; a sampling capacitor $C_{SH}$; a column-selecting MOS switch M14; an additional capacitor for increasing the gate-source capacity of the sampling MOS switch M12 (hereinafter referred to as a damping capacitor) $C_{DS}$; a damping capacitor $C_{DC}$ of the column-selecting MOS switch M14; a VHB modulation circuit (including: a horizontal signal line reset MOS switch M15; a constant voltage source V0; resistors R1 and R2) which applies, to a horizontal signal line HSIG, a bias voltage VHB synchronized to a clamp pulse φ CL; and a control specific gate circuit (including MOS switches G1 and G2 attached to the gate) for the column selecting MOS switch M14.

Figure 7:
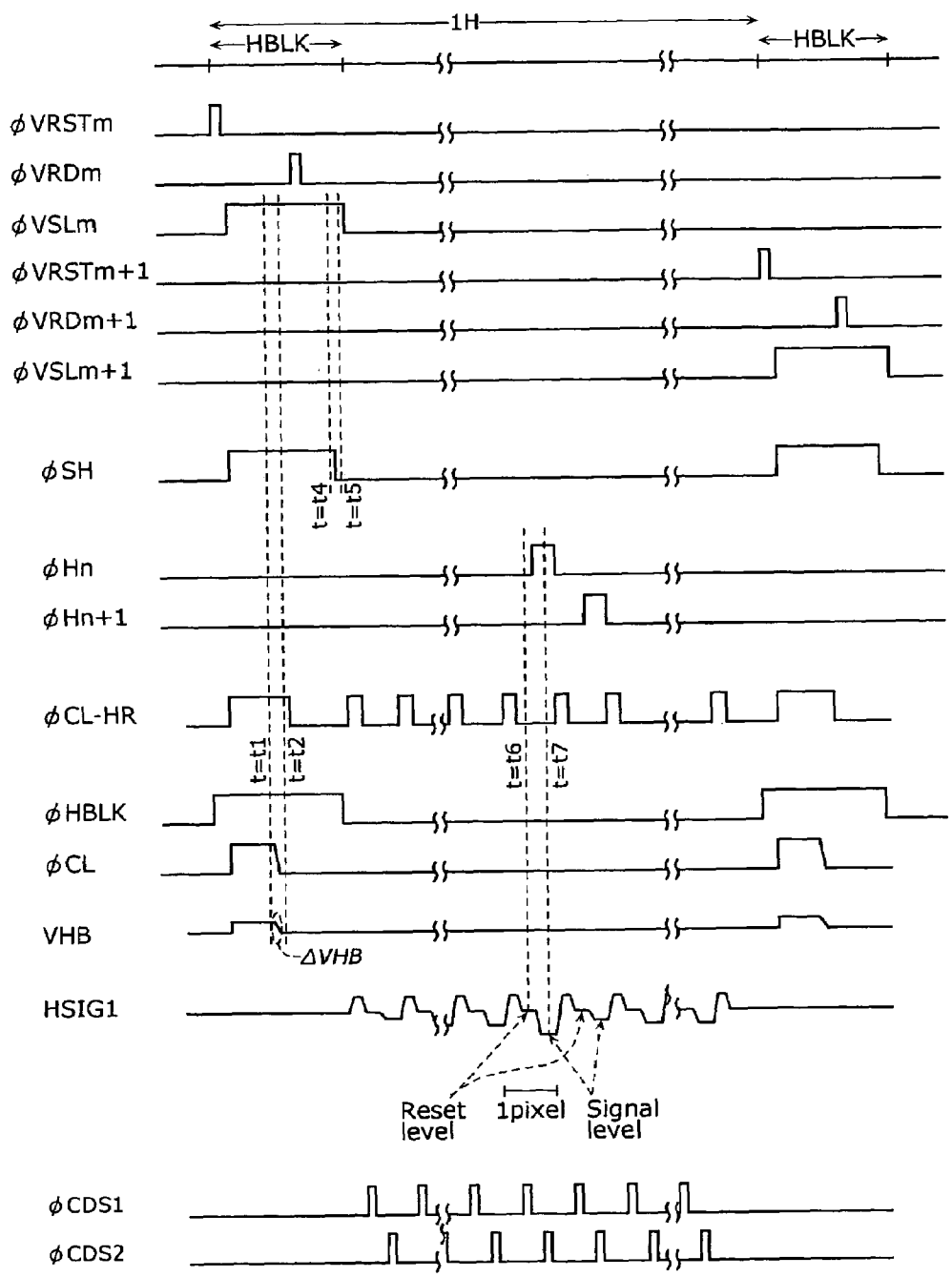
FIG. 7 is a timing chart showing operations of the solid-state imaging apparatus according to the first embodiment of the present invention.

FIG. 7 is a timing chart showing operations of the solid-state imaging apparatus as shown in FIG. 1. The operation in the pixel of the mth row is as follows. First, at the beginning of the horizontal blanking period HBLK, a row reset pulse φVRSTm is generated from a vertical shift register 90. Then, in the pixel of the mth row, a floating diffusion FD which converts, into a signal voltage, a signal charge that has been photoelectrically converted in a photodiode PD is reset to a source voltage VDD.

Next, in the clamp phase (t≦t1), a row-selecting pulse φVSLm, a sample pulse φ SH, a clamp pulse φ CL, a clamp and horizontal signal line reset pulse φ CL-HR are raised.

Here, to each column signal line (VSIG1, ..., VSIGn, ... VSIGN), from the pixel of the mth row, the first pixel signal which has reset the floating diffusion FD is outputted. And, under the state where the voltage of the column signal line VSIGn is the first pixel signal, a bias voltage VHB is applied to the electrode on the side of the sampling MOS switch M12 of the sampling capacitor $C_{SH}$. Here, the value of the bias voltage VHB is the total sum of (i) the voltage of the clamp pulse φ CL in High state, divided by the resistors R1 and R2, and (ii) a constant voltage V0.

After that, the clamp pulse φ CL is changed to low level. The clamp pulse φ CL turns the column-selecting MOS switch M14 into OFF state, via the MOS switch G1 having a gate. Thus, the sampling capacitor $C_{SH}$ is clamped to the bias voltage VHB (from t=t1 to t=t2). Here, the bias voltage VHB, in synchronization with the trailing of the clamp pulse φ CL, decreases by a constant voltage (voltage expressed by the voltage of the clamp pulse φ CL and the resistors R1 and R2). If it is not necessary to apply the bias voltage VHB to the sampling capacitor $C_{SH}$, the clamp and horizontal signal line reset pulse φ CL-HR is lauched, and the clamp phase is completed.

Next, before the sample phase, in order to transfer, to the floating diffusion FD, the signal charge which has been photoelectrically converted in the photodiode PD, a column readout pulse φVRDm is generated from the vertical shift register 90. Then, the electric potential of the floating diffusion FD changes according to the amount of the signal charge that have been photoelectrically converted in the photodiode PD, and the second pixel signal is outputted from the pixel of the mth row.

After that, in the sample phase, since the second pixel signal is already outputted into the column signal line VSIGn, the difference between the first and second pixel signals based on the bias voltage VHB, that is, the voltage appears depending on only the charge quantity of the photoelectric conversion, in which threshold unevenness (fixed pattern noise of the pixel) of the amplified MOS switch M3 in the pixel is deducted, in the electrode on the side of the sampling MOS switch M12 of the sampling capacitor $C_{SH}$ due to the capacitive coupling. In the sample phase (from t=t4 to t=t5), the operation for trailing the sample pulse φ SH is executed, so as to have the sampling capacitor $C_{SH}$ hold the signal, and the phase is completed.

From the operation for resetting the floating diffusion FD of the pixel, the sample phase is executed during the horizontal blanking period HBLK. After that, during the horizontal display period, in the horizontal outputting phase (from t=t6 to t=t7), the pixel signals held in the sampling capacitor $C_{SH}$ appear in the horizontal signal line HSIG sequentially from the end of the pixel in the mth row, due to the column-selecting pulse φ Hn sequentially generated in horizontal direction from the horizontal shift register 91. Before each pixel signal appears, the horizontal signal line HSIG needs to be reset. Thus, at the beginning of one pixel period, the clamp and horizontal signal line reset pulse φ CL-HR is generated. In the latter half of the one pixel period, (i) the column-selecting pulse φ Hn is generated, (ii) the pixel signal held in the sampling capacitor $C_{SH}$ is outputted to the horizontal signal line HSIG, and (iii) the voltage change during the one pixel period is detected in the CDS circuit 93 connected to the output of the amplifier AMP 92, so as to be outputted as a pixel signal. The control specific gate circuit (including the MOS switches attached to the gate, G1 and G2) for the column-selecting MOS switch M14 switches the operations so that the column-selecting MOS switch M14 is controlled (i) by the clamp pulse φ CL during the horizontal blanking period HBLK, and (ii) by the column-selecting pulse φ Hn during the horizontal display period.

Next, according to the solid-state imaging apparatus of the present embodiment, the mechanism in which individual column CDS circuit connected to each column does not generate fixed pattern noise will be explained.

Figure 8B:
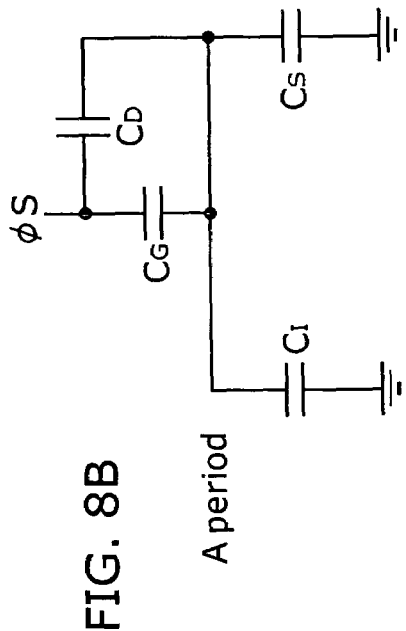
FIG. 8A, FIG. 8B, FIG. 8C and FIG. 8D are diagrams respectively showing sampling circuits of the solid-state imaging apparatus according to the first embodiment of the present invention.
Figure 8C:
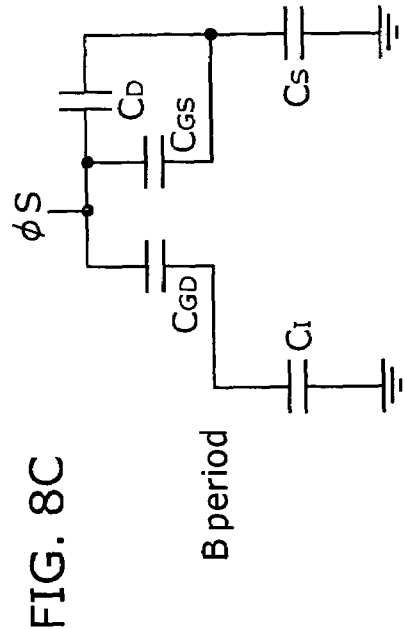
Figure 8A:
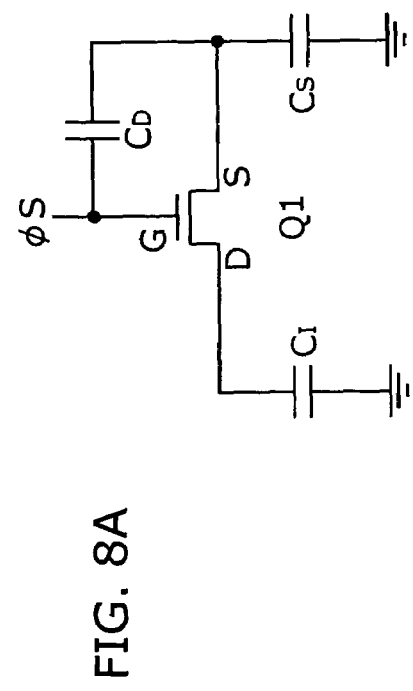

FIG. 8A, FIG. 8B, FIG. 8C and FIG. 8D are circuit diagrams for explaining the mechanism. FIG. 8A shows a sampling circuit according to the present embodiment. Here, a capacitive signal source called CI is included on the input signal side, and connected to the drain of the sampling MOS switch Q1. A sampling capacitor $C_S$ is connected to the source side of the sampling MOS switch Q1, and a damping capacitor $C_D$ is connected between the gate and the source. As shown in FIG. 8A, by adding the damping capacitor $C_D$ between the gate and the source of the sampling MOS switch Q1, even if there is unevenness in the threshold values of the MOS switches in a plurality of sampling circuits, unevenness of the voltages to be sampled can be prevented from occurring.

FIG. 8B and FIG. 8C show equivalent circuits (capacitor models) respectively with the sampling MOS switch Q1 in ON state and in OFF state. The gate capacitor $C_G$ has a total sum of (i) a gate-source capacity $C_{GS}$, (ii) a gate-drain capacity $C_{GD}$ and (iii) a gate oxide film capacity $C_{GO}$, as shown in the following equation.

$$C_G = C_{GS} + C_{GD} + C_{GO}$$

Figure 8D:
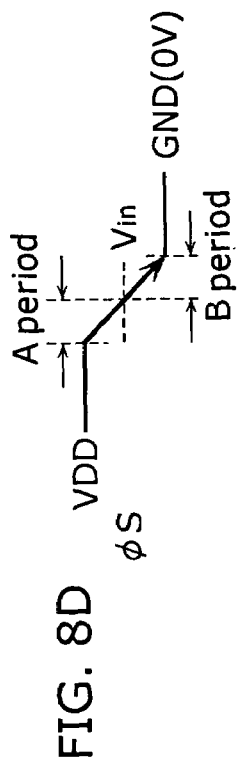

As shown in FIG. 8D, assuming that (i) the time spent when the sampling pulse φS reaches from the source voltage VDD to the threshold value $V_{th}$ of the sampling MOS switch Q1 is A period, and (ii) the time spent when the sampling pulse φS reaches from the threshold value $V_{th}$ to GND is B period, in the A period, the sampling circuit is the equivalent circuit as shown in FIG. 8B, and in the B period, the sampling circuit is the equivalent circuit as shown in FIG. 8C. According to the above mentioned equivalent circuits, in each of the A period and B period, the electric charge quantities $Q_{CS-A}(V_{th})$ and $Q_{CS-B}(V_{th})$ flowing into the sampling capacitor $C_S$ can be shown in the following equation.

$$Q_{C_S-A}(V_{th}) = \frac{C_S(C_D + C_G)}{C_S + C_I + C_D + C_G}(\Delta V_{th} - VDD) \quad \text{[Equation 6]}$$

$$Q_{C_S-B}(V_{th}) = \frac{C_S(C_D + C_{GS})}{C_S + C_D + C_{GS}}(0 - V_{th})$$

As a result, in the sampling capacitor $C_S$ of the two sampling circuits structured by the sampling MOS switches which have different threshold values ($V_{th1}$ and $V_{th2}$), the total sum of (i) the electric charge quantity difference ΔQcs (the electric charge quantity difference ($Q_A(V_{th1})-Q_A(V_{th2})$)) in A period and (ii) the electric charge quantity difference ($Q_B(V_{th1})-Q_B(V_{th2})$) in the B period can be shown in the following equation.

$$\Delta Q_{C_S} = Q_A(V_{th1}) - Q_A(V_{th2}) + Q_B(V_{th1}) - Q_B(V_{th2}) \quad \text{[Equation 7]}$$

$$= \left\{ \frac{C_S(C_D + C_G)}{C_S + C_I + C_D + C_G} - \frac{C_S(C_D + C_{GS})}{C_S + C_D + C_{GS}} \right\}$$

$$\Delta V_{th}$$

Using (i) a conditional equation for making the electric charge quantity difference $\Delta Q_{cs}$ zero, and (ii) the above mentioned relational equation of the gate capacitor $C_G$, the damping capacitor $C_D$ can be shown in the following equation.

$$C_D = \frac{C_S}{C_I}(C_{GO} + C_{GD}) - C_{GS} \quad \text{[Equation 8]}$$

As described above, by making the damping capacitor $C_D$ the value as shown in the above equation, the electric charge quantity difference $\Delta Q_{cs}$ becomes zero, thus the difference between the voltages sampled in the two sampling circuits disappears.

By applying the above mentioned relational equation to the present embodiment, the capacity values of the damping capacitors $C_{DS}$ and $C_{DC}$ as shown in FIG. 6 can be determined.

First, the damping capacitor $C_{DS}$ for removing the fixed pattern noise generated in the sampling phase (from t=t4 to t=t5), as shown in FIG. 1, can be shown in the following equation.

$$C_{DS} = \frac{C_{SH} + C_{DC} + C_{GSH}}{C_{CL}}(C_G - C_{GS}) - C_{GS} \quad \text{[Equation 9]}$$

$$\approx \frac{C_{SH}}{C_{CL}}(C_{GO} + C_{GD}) - C_{GS}$$

Here, the approximation in the above equation uses the following relation.

$$C_{SH} >> C_{DC} + C_{GSH}$$

Also, $C_G$, $C_{GS}$, $C_{GD}$ and $C_{GO}$ are respectively a gate capacity, a gate-source capacity, a gate-drain capacity, and a gate oxide film capacity of the sampling MOS switch M12. And, $C_{GSH}$ is a gate-source capacity of the column-selecting MOS switch M14.

Next, in the clamp phase (from t=t1 to t=t2) and in the horizontal output phase (from t=t6 to t=t7), since the clamp and the horizontal output are executed using the same MOS switch (the column-selecting MOS switch M14), by (i) connecting the damping capacitor $C_{DC}$ of the constant capacity between the gate and the source of the column-selecting MOS switch M14, and (ii) modulating the bias voltage VHB as the clamp bias, so as to be synchronized with the trailing of the clamp pulse φ CL, the fixed pattern noise of both phases can be removed.

The concrete condition is to make the voltage change Δ VHB of the bias voltage VHB and the capacity of the damping capacitor $C_{DC}$ respectively as shown in the following equations.

$$\Delta VHB = \alpha \frac{C_{DC} + C_{GH}}{C_S + C_H + C_{DC} + C_{GH}} \Delta \phi CL \quad \text{[Equation 10]}$$

$$C_{DC} = \frac{1}{\left( \alpha \frac{C_S}{C_S + C_H} - 1 \right)}$$

$$\left( \frac{C_{SH} + C_{CL}}{C_{SH}} C_{GOH} + C_{GSH} - \alpha \frac{C_S}{C_S + C_H} C_{GH} \right)$$

Here, the following equation must be fulfilled.

$$\alpha = \frac{C_S + C_H}{C_S} \frac{1}{C_{DC} + C_{GH}} \left( C_{DC} + \frac{C_{SH} + C_{CL}}{C_{SH}} C_{GOH} + C_{GSH} \right)$$ [Equation 11]

$$C_S = C_{SH} + C_{CL} + C_{DS} + C_G$$

$$C_G = C_{GS} + C_{GO} + C_{GD}$$

$$C_{GH} = C_{GSH} + C_{GOH} + C_{GDH}$$

In addition, the condition for the resistors R1 and R2 in the VHB modulation circuit is as follows.

$$\frac{R2}{R1 + R2} = \alpha \frac{C_{DC} + C_{GH}}{C_S + C_H + C_{DC} + C_{GH}}$$ [Equation 12]

The derivation method for the conditional equations of the above mentioned clamp phase and horizontal output phase will be concretely explained as following.

Figure 9A:
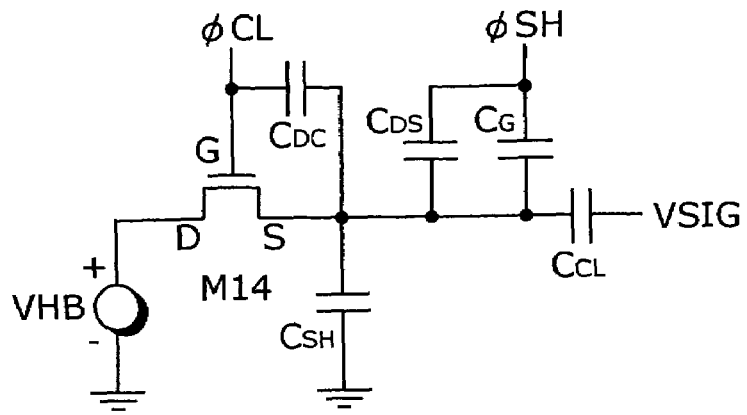
FIG. 9A and FIG. 9B are diagrams showing the operation in the clamp phase in the sampling circuit of the solid-state imaging apparatus according to the first embodiment of the present invention.
Figure 9B:
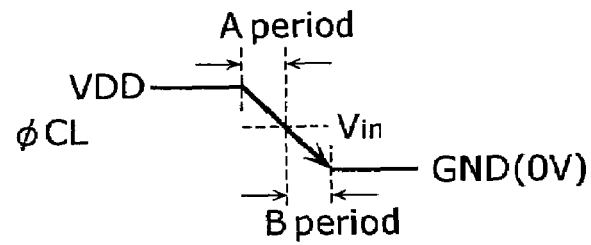

First, unevenness of the electric charge quantity in the clamp phase is calculated. FIG. 9A and FIG. 9B are diagrams showing the unevenness of the electric charge quantity in the clamp phase. FIG. 9A is a circuit diagram of the part which affects the electric charge quantity flowing into the sampling capacitor $C_{SH}$ in the clamp phase. And, FIG. 9B is a diagram showing a waveform of the clamp pulse φ CL in the clamp phase.

In each of the A period and B period as shown in FIG. 9B, the electric charges flowing into the sample capacitor $C_{SH}$, $Q_A(V_{th})$ and $Q_B(V_{th})$ can be shown in the following equation.

$$Q_A(V_{th}) = \frac{\alpha C_S (C_{DC} + C_{GH})}{C_S + C_H + C_{DC} + C_{GH}} (V_{th} - VDD)$$ [Equation 13]

$$Q_B(V_{th}) = \frac{\alpha C_S (C_{DC} + C_{GSH})}{C_S + C_{DC} + C_{GSH}} (0 - V_{th})$$

$$C_S = C_{SH} + C_{CL} + C_{DS} + C_G$$

$$C_G = C_{GS} + C_{GO} + C_{GD}$$

$$C_{GH} = C_{GSH} + C_{GOH} + C_{GDH}$$

However, in order to show the effect that when the clamp pulse φ CL is inputted, the horizontal signal line HSIG becomes capacitative (becoming the capacity CI as shown in FIG. 8A), from the viewpoint of the column-selecting MOS switch M14, the bias voltage VHB is modulated, in synchronization with the clamp pulse φCL from the A period until the B period.

$$\Delta VHB = \alpha \frac{C_{DC} + C_{GH}}{C_S + C_H + C_{DC} + C_{GH}} \Delta\phi CL$$ [Equation 14]

According to the above mentioned equation of the electric charge, unevenness of the electric charge quantity $\Delta Q_{clamp}$ in the clamp phase, due to the different threshold voltages, $V_{th1}$ and $V_{th2}$, of the column-selecting MOS switch 14 can be shown in the following equation.

$$\Delta Q_{Clamp} = Q_A(V_{th1}) - Q_A(V_{th2}) + Q_B(V_{th1}) - Q_B(V_{th2})$$ [Equation 15]

$$= \left( \frac{\alpha C_S (C_{DC} + C_{GH})}{C_S + C_H + C_{DC} + C_{GH}} - \frac{C_S (C_{DC} + C_{GSH})}{C_S + C_{DC} + C_{GSH}} \right) \Delta V_{th}$$

$$\Delta V_{th} = V_{th1} - V_{th2}$$

Figure 10A:
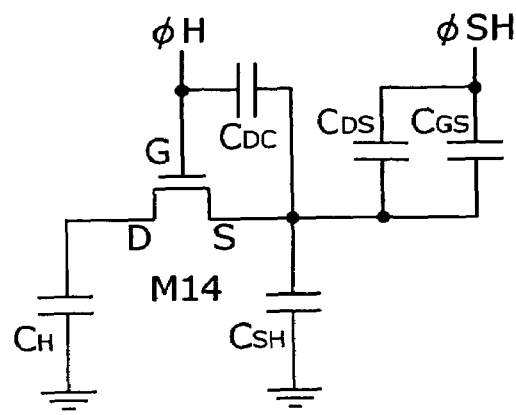
FIG. 10A and FIG. 10B are diagrams showing the operation in the horizontal output phase in the sampling circuit of the solid-state imaging apparatus according to the first embodiment of the present invention.
Figure 10B:
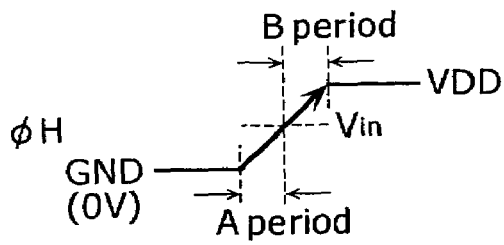

Next, unevenness of the electric charge quantity in the horizontal output phase will be calculated. FIG. 10A and FIG. 10B are diagrams showing the unevenness of the electric charge quantity in the horizontal output phase. FIG. 10A is a circuit diagram of the part which affects the electric charge quantity that flows into the sampling capacitor $C_{SH}$ in the horizontal output phase. FIG. 10B is a diagram showing the waveform of the column-selecting pulse φ H in the horizontal output phase.

The electric charges $Q_A(V_{th})$ and $Q_B(V_{th})$ which flow into the sampling capacitor $C_{SH}$ respectively in A period and B period as shown in FIG. 10B can be shown in the following equations.

$$Q_A(V_{th}) = Q_{A-SH}(V_{th}) + Q_{A-H}(V_{th})$$ [Equation 16]

$$Q_{A-SH}(V_{th}) = \frac{(C_{SH} + C_{DS} + C_{GS})(C_{DC} + C_{GSH})}{C_{SH} + C_{DS} + C_{GS} + C_{DC} + C_{GSH}} V_{th}$$

$$Q_{A-H}(V_{th}) = \frac{C_H C_{GDH}}{C_H + C_{GDH}} V_{th}$$

$$Q_B(V_{th}) = \frac{(C_{SH} + C_{DS} + C_{GS} + C_H)(C_{GH} + C_{DC})}{C_{SH} + C_{DS} + C_{GS} + C_H + C_{GH} + C_{DC}} (V_{DD} - V_{th})$$

According to the above equations of the electric charge, the unevenness of the electric charge quantity $\Delta Q_{HOUT}$ in the horizontal output phase caused by the different threshold voltages $V_{th1}$ and $V_{th2}$ in the column-selecting MOS switch M14 can be shown in the following equation.

$$\Delta Q_{Hout} = Q_A(V_{th1}) - Q_A(V_{th2}) + Q_B(V_{th1}) - Q_B(V_{th2})$$ [Equation 17]

$$= \left( \frac{(C_{SH} + C_{DS} + C_{GS})(C_{DC} + C_{GSH})}{C_{SH} + C_{DS} + C_{GS} + C_{DC} + C_{GSH}} + \frac{C_H C_{GDH}}{(C_H + C_{GDH})} - \frac{(C_{SH} + C_{DS} + C_{GS} + C_H)(C_{GH} + C_{DC})}{C_{SH} + C_{DS} + C_{GS} + C_H + C_{GH} + C_{DC}} \right) \Delta V_{th}$$

The unevenness of the electric charge quantity Δ Q which is combined unevenness of the electric charge quantity in the clamp phase and the horizontal output phase should be zero, thus can be shown in the following equation.

$$\frac{\Delta Q}{\Delta V_{th}} = \frac{C_{SH} + C_{DS} + C_{GS}}{C_{SH} + C_{DS} + C_{GS} + C_{CL}} \frac{\Delta Q_{Clamp}}{\Delta V_{th}} +$$ [Equation 18]

-continued $$\frac{\Delta Q_{Hout}}{\Delta V_{th}}$$

$$\approx \frac{C_{SH}}{C_{SH} + C_{CL}} \left\{ \alpha \frac{C_S}{C_S + C_H}(C_{DC} + C_{GH}) - C_{DC} - C_{GSH} \right\} + (C_{DC} + C_{GSH}) + C_{GDH} -$$

$$(C_{GH} + C_{DC})$$

As a condition for making the value of the above Δ Q zero, the following $C_{DC}$ or α (combination) can be derived.

$$C_{DC} = \frac{1}{\left(\alpha \frac{C_S}{C_S + C_H} - 1\right)} \quad \text{[Equation 19]}$$

$$\left(\frac{C_{SH} + C_{CL}}{C_{SH}} C_{GOH} + C_{GSH} - \alpha \frac{C_S}{C_S + C_H} C_{GH}\right)$$

$$\alpha = \frac{C_S + C_H}{C_S} \frac{1}{C_{DC} + C_{GH}} \left(C_{DC} + \frac{C_{SH} + C_{CL}}{C_{SH}} C_{GOH} + C_{GSH}\right)$$

As described above, according to the present embodiment, (i) the damping capacitor $C_{DS}$ of a constant capacity is connected between the gate and the source of the sampling MOS switch M12 in the column CDS circuit, (ii) the damping capacitor $C_{DC}$ of a constant capacity is connected between the gate and the source of the column-selecting MOS switch M14, and (iii) the bias voltage VHB applied to the horizontal signal line is changed in synchronization with the clamp pulse φ CL, so as to effectively remove or control the longitudinal fixed pattern noise caused by the non-uniformity of the column CDS circuit.

According to the present embodiment, the bias voltage VHB applied to the horizontal signal line is changed in synchronization with the clamp pulse φ CL. In the case where during the horizontal blanking period HBLK, the column-selecting pulse φ Hn is outputted in the same timing as the clamp pulse φ CL, the bias voltage VHB may be changed in synchronization with the column-selecting pulse φ Hn outputted during the horizontal blanking period HBLK. In other words, if the bias voltage can be changed in synchronization with the signal which controls the column-selecting MOS switch M14 from ON state to OFF state in the clamp phase, the changing signal may be either the clamp pulse φ CL or the column-selecting pulse φ Hn.

Second Embodiment

Next, the second embodiment of the present invention will be explained.

Figure 11:
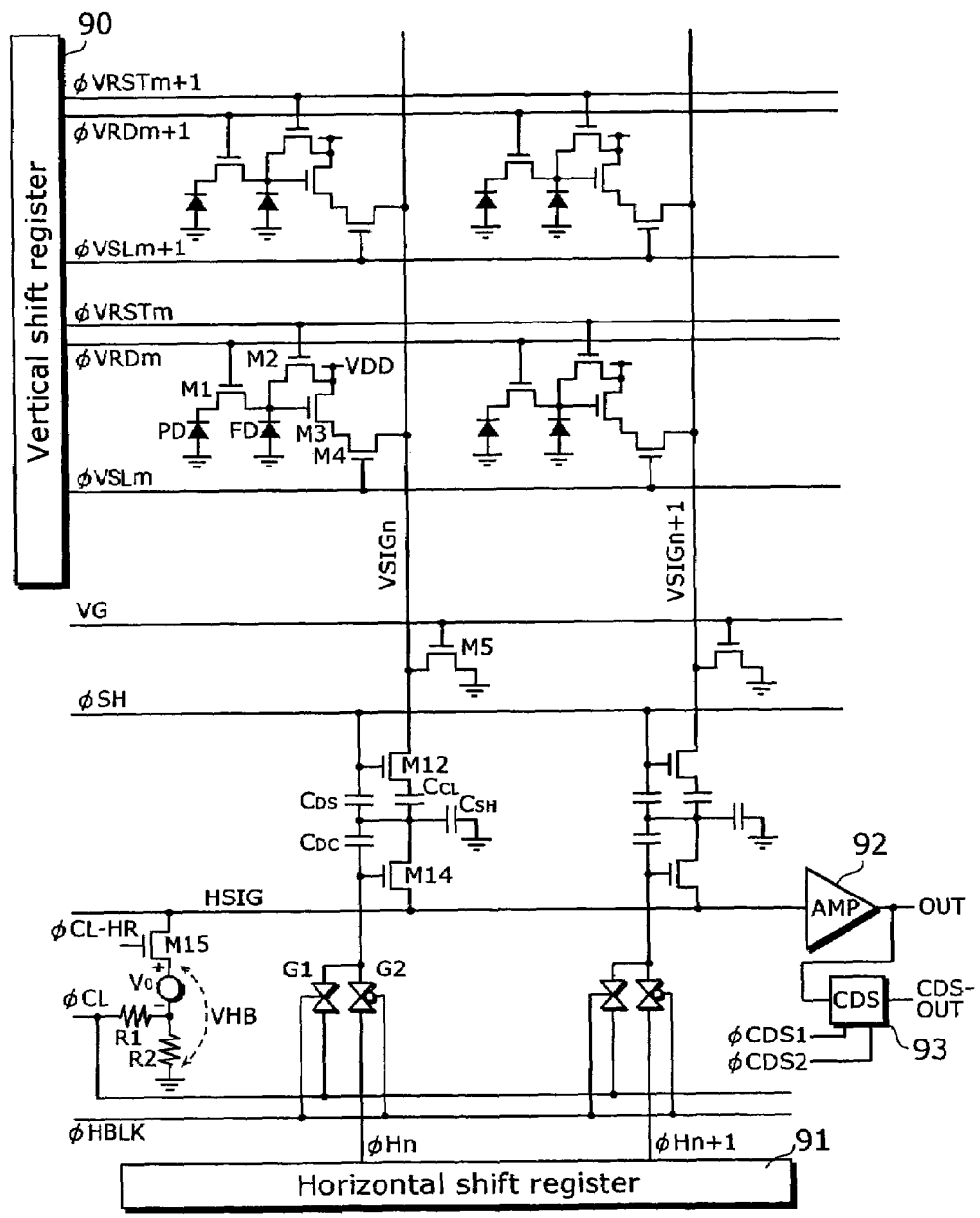
FIG. 11 is a circuit diagram of the solid-state imaging apparatus according to the second embodiment of the present invention.

FIG. 11 is a circuit diagram of the solid-state imaging apparatus according to the second embodiment. As well as the first embodiment, the solid-state imaging apparatus according to the present embodiment basically comprises an imaging device and a column CDS circuit. However, the connection of the column CDS circuit is different from the first embodiment. The different features from the first embodiment will be mainly explained as follows.

The input terminal of the column CDS circuit is the drain of the sampling MOS switch M12, and the clamp capacitor $C_{CL}$ is connected to the source. The sampling capacitor $C_{SH}$ is serially connected to the clamp capacitor $C_{CL}$, and the source of the column-selecting MOS switch is connected to the node.

The drain of the column-selecting MOS switch is equivalent to the output of the column CDS circuit, and connected to the horizontal signal line HSIG. A clamp and horizontal signal line reset bias circuit is connected to the horizontal signal line HSIG. The clamp and horizontal signal line reset bias circuit includes a bias voltage VHB and a clamp and horizontal signal line reset MOS switch.

Figure 12:
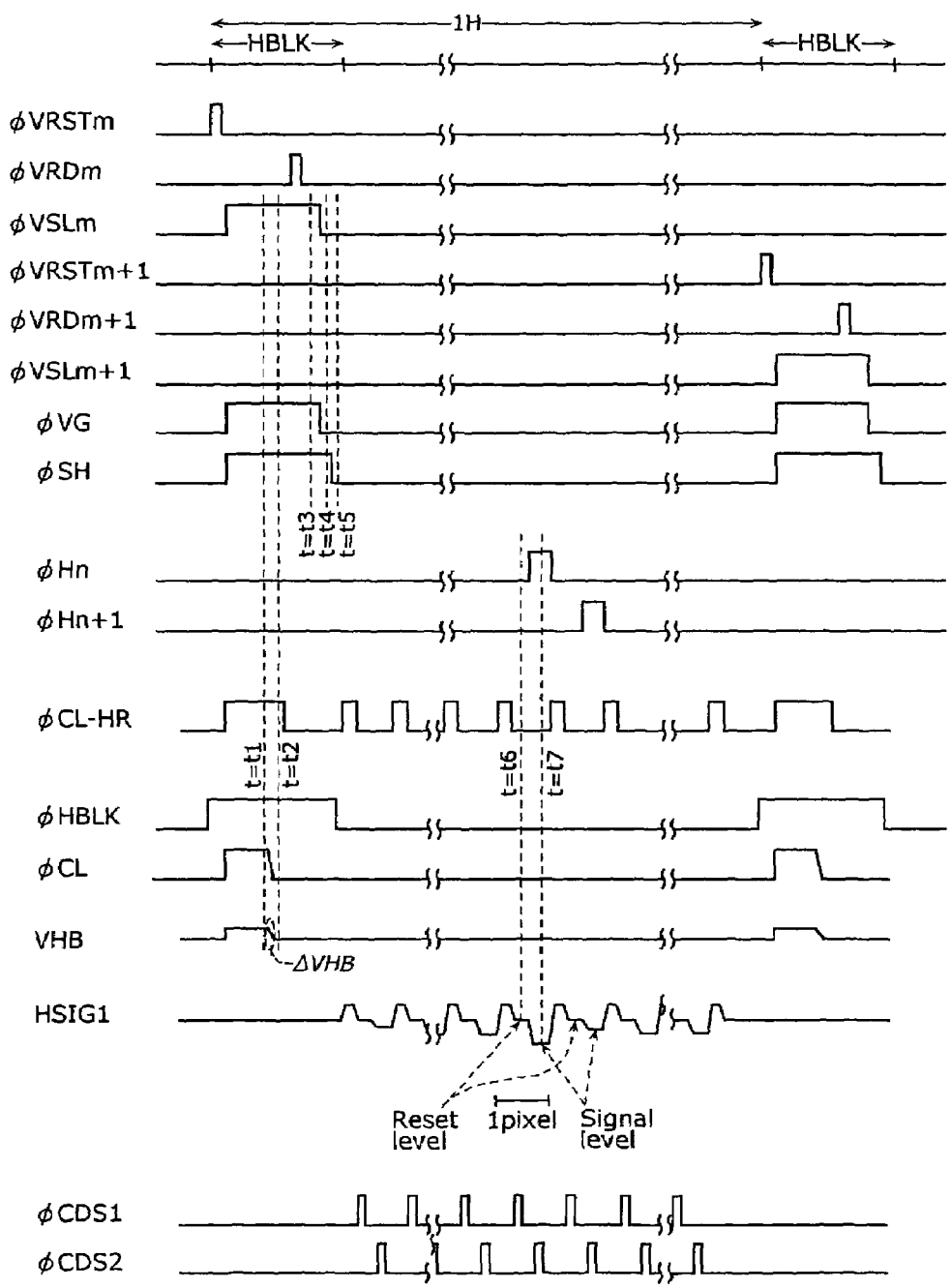
FIG. 12 is a timing chart showing operations of the solid-state imaging apparatus according to the second embodiment of the present invention.

FIG. 12 is a timing chart showing the operations of the solid-state imaging apparatus as shown in FIG. 11. The operational difference from the first embodiment is that from the viewpoint of the sampling MOS switch M12, the column signal line VSIGn is not capacitative, and the signal output (voltage source) from the pixel can be seen directly. Thus, in order to create the effect of the capacitor $C_I$ as shown in FIG. 8A, the column signal line VSIGn is put into a floating state in the sampling phase, and the parasitic capacity of the column signal line VSIGn is used as the capacity $C_I$. Therefore, unlike the first embodiment, as shown in FIG. 12, before the sampling pulse φ SH is changed to low level in the sampling phase (t=t4-t5), in order to electrically float the column signal line VSIGn, (i) the row-selecting pulse φ VSLm and (ii) the gate voltage φVG of the MOS transistor M5 which is the pixel load are changed to low level (t=t3-t4). The other operations are the same as the first embodiment.

The circuit structure and operations of the column CDS circuit according to the second embodiment are slightly different from the first embodiment. Thereby, (i) the equation for providing an appropriate value of the damping capacitor, and (ii) the coefficient α for providing the voltage change of the bias voltage in the clamp phase (t=t1-t2) can be shown as following. Here, the derivation methods for the above mentioned values are the same as the first embodiment.

$$C_{DS} = \frac{C_{SH}C_{CL}}{C_V(C_{SH} + C_{CL})}(C_{GO} + C_{GD}) - C_{GS} \quad \text{[Equation 20]}$$

$$C_{DC} = \frac{1}{\left(\alpha \frac{C_S}{C_S + C_H} - 1\right)}$$

$$\left(\frac{C_{SH} + C_{CL}}{C_{SH}} C_{GOH} + C_{GSH} - \alpha \frac{C_S}{C_S + C_H} C_{GH}\right)$$

$$\alpha = \frac{C_S + C_H}{C_S} \frac{1}{C_{DC} + C_{GH}}$$

$$\left(C_{DC} + \frac{C_{SH} + C_{CL}}{C_{SH}} C_{GOH} + C_{GSH}\right)$$

$$C_S = C_{SH} + \frac{C_{CL}C_V}{C_{CL} + C_V}$$

Here, $C_V$ indicates the capacity of column signal line.

As described above, according to the present embodiment, (i) the damping capacitor $C_{DS}$ of a constant capacity is connected between the gate and the source of the sampling MOS switch M12 in the column CDS circuit, (ii) the column signal line VSIGn is electrically floated in the sampling phase, (iii) the damping capacitor $C_{DC}$ of a constant capacity is connected between the gate and the source of the MOS switch M14, (iv) the bias voltage VHB applied to the horizontal signal line is changed in synchronization with the clamp pulse φ CL, so as to effectively remove or control the longitudinal fixed pattern noise caused by the non-uniformity of the column CDS circuit.

Third Embodiment

Next, the third embodiment according to the present invention will be explained.

Figure 13:
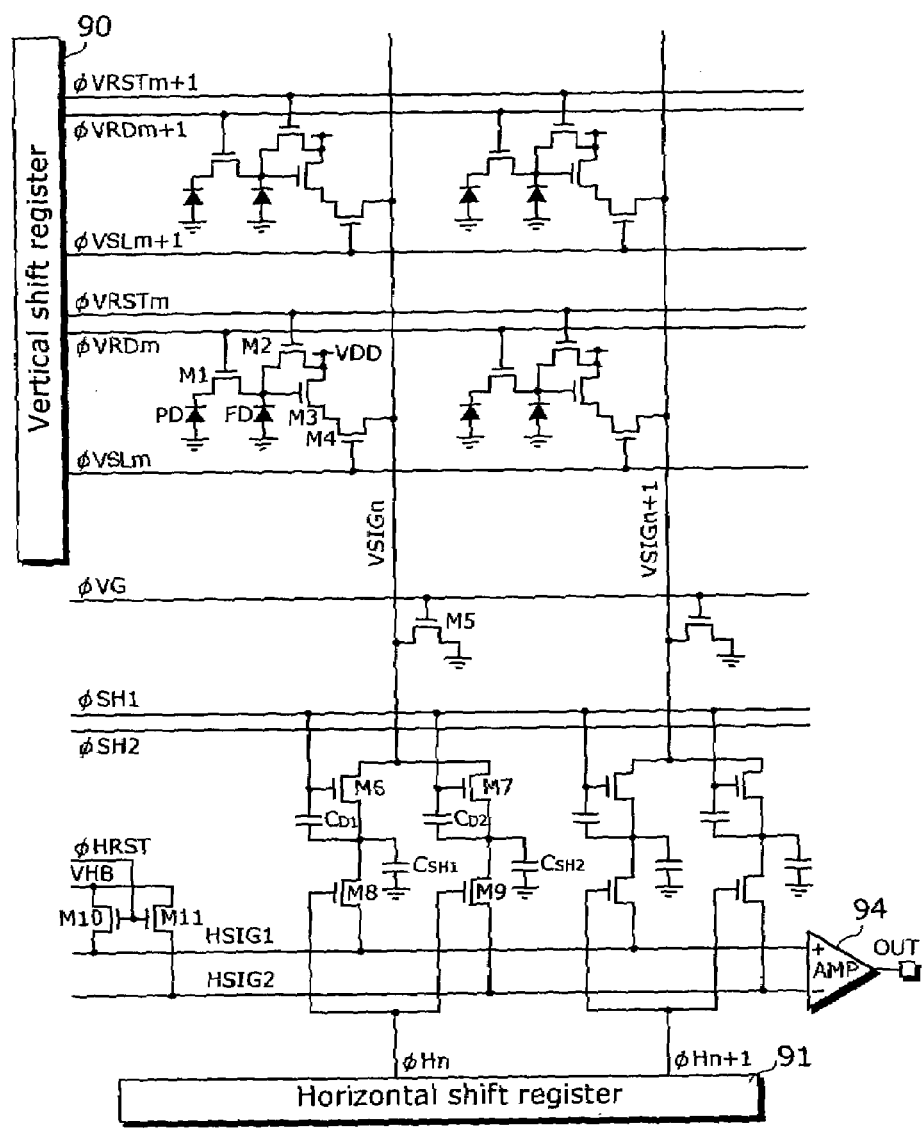
FIG. 13 is a circuit diagram of the solid-state imaging apparatus according to the third embodiment of the present invention.

FIG. 13 is a circuit diagram of the solid-state imaging apparatus according to the third embodiment of the present invention. The solid-state imaging apparatus according to the third embodiment comprises, per column signal line VSIGn, in addition to the CDS circuit according to the first embodiment, two sampling circuits ((i) a sampling circuit including a sampling MOS switch M6, a column-selecting MOS switch M8, a damping capacitor $C_{D1}$ and a sampling capacitor $C_{SH1}$, and (ii) a sampling circuit including a sampling MOS switch M7, a column-selecting MOS switch M9, a damping capacitor $C_{D2}$ and a sampling capacitor $C_{SH2}$). Also, in stead of the output circuits 92 and 93 according to the first embodiment, a differential AMP 94 connected to two horizontal signal lines, HSIG1 and HSIG2 is included.

The present solid-state imaging apparatus is different from the correlational double sampling in which the first pixel signal (signal from the reset floating diffusion FD) and the second pixel signal (signal from the floating diffusion FD after the electric charge of the photodiode PD is transferred) are sampled in the same sampling circuit. The present solid-state imaging apparatus is a circuit which realizes a method for removing the fixed pattern noise of the pixel by (i) sampling the first and second pixel signals in different sampling circuits, (ii) outputting the sampled first and second pixel signals respectively into the independent two horizontal signal lines HSIG1 and HSIG2, and (iii) providing the sampled first and second pixel signals to the inversion input and non-inversion input of the differential AMP 94.

Figure 14:
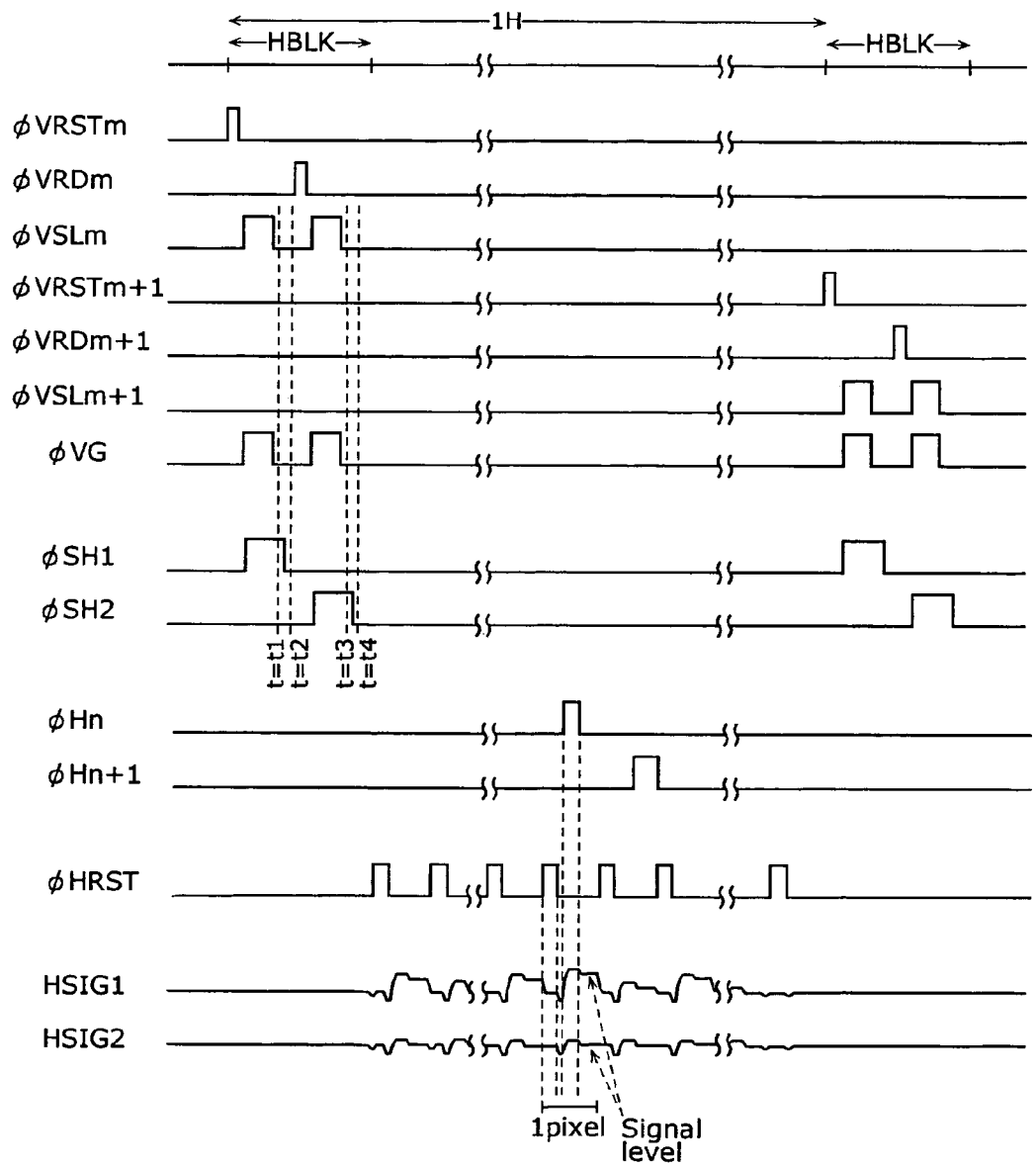
FIG. 14 is a timing chart showing operations of the solid-state imaging apparatus according to the third embodiment of the present invention.

FIG. 14 is a timing chart showing operations of the solid-state imaging apparatus as shown in FIG. 13. In the sampling phase (t=t1-t2 and t3-t4), using the same method as the second embodiment, the unevenness of the electric charge quantity in the sampling capacitor can be removed. In other words, (i) the value of the damping capacitors $C_{D1}$ and $C_{D2}$ connected between the gate and the source of the sampling MOS switches M6 and M7 can be determined in the same way as the second embodiment, (ii) the column signal line VSIGn is floated in the sampling phase, so as to execute the operation as the capacitive input.

The clamp phase does not exist in the present solid-state imaging apparatus. Thus, in the horizontal output phase, as shown in the timing chart in FIG. 14, in order to superficially remove the electric charge flowing in from the column-selecting MOS switches M8 and M9, after the horizontal signal lines HSIG1 and HSIG2 are reset by the horizontal signal line reset signal φ HRST in the head of the one pixel period, the column-selecting pulse φ Hn is outputted in the middle of one pixel period, so as to temporarily turn on the column-selecting MOS switches M8 and M9. Immediately after the column-selecting MOS switches M8 and M9 are turned off, the signals in the horizontal signal lines HSIG1 and HSIG2 are used as image signals. Thereby, the secondary longitudinal fixed pattern noise generated in the column-selecting MOS switch can be removed.

As described above, according to the present embodiment, (i) the damping capacitors $C_{D1}$ and $C_{D2}$ of a constant capacity are connected between the gate and the source of the sampling MOS switches M6 and M7, (ii) the column signal line VSIGn is electrically floated in the sampling phase, (iii) after the horizontal signal line is reset during one pixel period, the column-selecting MOS switch is temporarily turned on, and (iv) the signals in the horizontal signal line immediately after the OFF state are outputted as image signals, so as to effectively remove or control the longitudinal fixed pattern noise caused by the non-uniformity of the sampling circuit.

Fourth Embodiment

Next, the fourth embodiment according to the present invention will be explained. In the fourth embodiment, the damping capacitor used in the sampling circuit of the solid-state imaging apparatus according to the first, second and third embodiments is incorporated in the MOS transistor.

Figure 15A:
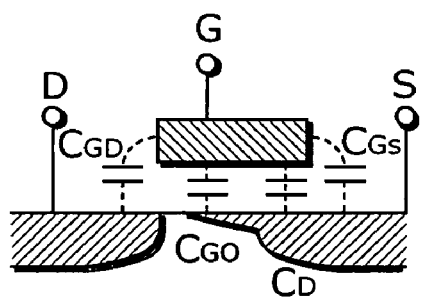
FIG. 15A is a diagram showing the structure of the MOS transistor (switch) according to the fourth embodiment of the present invention.
Figure 15B:
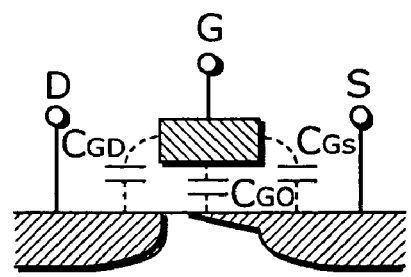
FIG. 15B is a diagram showing the structure of a regular MOS transistor.

FIG. 15A is a diagram showing the structure of the MOS transistor (switch) according to the present embodiment. As evident in comparison to the regular MOS transistor as shown in FIG. 15B, in the MOS transistor according to the present embodiment, gate electrodes and source diffusion are overlapped, sandwiching the gate oxide film. Thus, the parasitic capacity generated in the overlapping part functions as the damping capacitor $C_D$, and the damping capacitor additionally connected between the gate and the source of the MOS transistor as described in the first, second and third embodiments is not necessary.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

The present invention can be utilized as a solid-state imaging apparatus used for an image input apparatus such as a video camera and a digital still camera, in particular, as a solid-state imaging apparatus comprising a sampling circuit which reads out signals from a MOS or CMOS imaging device.

What is claimed is:

1. A solid-state imaging apparatus comprising a sampling circuit in which a signal from a photodiode is sampled,
   wherein said sampling circuit includes:
   a sampling capacitor for holding the signal;
   a sampling Metal Oxide Semiconductor (MOS) switch, said sampling MOS switch being a MOS transistor that (i) transmits the signal to said sampling capacitor, or (ii) blocks the transmission of the signal to said sampling capacitor;
   a first damping capacitor connected to (i) one of a source electrode and a drain electrode of said sampling MOS switch, the one electrode being connected to said sampling capacitor and (ii) a gate electrode of said sampling MOS switch; and
   a clamp capacitor connected to one of the source electrode and the drain electrode of said sampling MOS switch.

2. The solid-state imaging apparatus according to claim 1, wherein a capacity of said first damping capacitor is expressed by at least one of (i) a capacity between the source electrode of said sampling MOS switch and a reference potential, (ii) a capacity between the drain electrode of said sampling MOS switch and the reference potential, and (iii) a specific capacity of said sampling MOS switch.

3. The solid-state imaging apparatus according to claim 1, wherein said sampling circuit further includes:
   a column-selecting MOS switch for turning on or off a connection between said sampling capacitor and an output line; and a second damping capacitor, the second damping capacitor being connected to (i) one of a source electrode and a drain electrode of said column-selecting MOS switch, the one electrode being connected to said sampling capacitor and (ii) a gate electrode of said column-selecting MOS switch.

4. The solid-state imaging apparatus according to claim 3, wherein a capacity of said second damping capacitor is expressed by at least one of (i) a capacity between the source electrode of said column-selecting MOS switch and a reference potential, (ii) a capacity between the drain electrode of said column-selecting MOS switch and the reference potential, (iii) a specific capacity of said column-selecting MOS switch, and (iv) a specific capacity of said sampling MOS switch.

5. The solid-state imaging apparatus according to claim 3, wherein said sampling circuit further includes a bias voltage application circuit in which a bias voltage is applied to the output line, and in said bias voltage application circuit, the bias voltage to be applied to the output line is changed in synchronization with a control signal that turns off said column-selecting MOS switch.

6. The solid-state imaging apparatus according to claim 1, wherein said sampling circuit further includes:

a clamp voltage application circuit in which a clamp voltage is applied to said clamp capacitor, and the signal transmitted from the photodiode is correlated double sampled.

7. The solid-state imaging apparatus according to claim 1, wherein said sampling circuit is one of two sampling circuits per one column of photodiodes, and the two sampling circuits are connected to each other in parallel so that one column signal line can be used for a common input, said column signal line transmitting a signal from the one column of photodiodes.

8. The solid-state imaging apparatus according to claim 7, wherein said sampling circuit further includes a column-selecting MOS switch for turning on or off a connection between said sampling capacitor and an output line, and when the signal held in said sampling capacitor is outputted to the output line, said column-selecting MOS switch is brought into a conduction state from a non-conduction state, and then brought into the non-conduction state again.

9. The solid-state imaging apparatus according to claim 1, wherein said first damping capacitor is made up of (i) one of a source electrode and a drain electrode of said sampling MOS switch, the one electrode being connected to said sampling capacitor, (ii) a gate electrode of said sampling MOS switch and (iii) a gate oxide film of the sampling MOS switch sandwiched between the source electrode and the drain electrode of said sampling MOS switch.

10. A sampling circuit in which a signal from a solid-state imaging device is sampled, the sampling circuit including:

a sampling capacitor for holding the signal;

a sampling MOS switch, said sampling MOS switch being a MOS transistor that (i) transmits the signal to said sampling capacitor, or (ii) blocks the transmission of the signal to said sampling capacitor;

a first damping capacitor connected to (i) one of a source electrode and a drain electrode of said sampling MOS switch, the one electrode being connected to said sampling capacitor and (ii) a gate electrode of said sampling MOS switch; and a clamp capacitor connected to one of the source electrode and the drain electrode of said sampling MOS switch.

11. The sampling circuit according to claim 10, further including:

a column-selecting MOS switch for turning on or off a connection between said sampling capacitor and an output line; and a second damping capacitor connected to (i) one of a source electrode and a drain electrode of said column-selecting MOS switch, the one electrode being connected to said sampling capacitor and (ii) a gate electrode of said column-selecting MOS switch.

* * * * *